Dec. 8, 1925.  M. S. GROH  1,564,777

MANIFOLD

Filed Dec. 24, 1924

WITNESSES
Edwin P. Walsh
Herbert J. Restich

INVENTOR
Melvin Solomon Groh
BY Cipriano Andrade Jr.
ATTORNEY

Patented Dec. 8, 1925.

1,564,777

UNITED STATES PATENT OFFICE.

MELVIN SOLOMON GROH, OF TORONTO, ONTARIO, CANADA, ASSIGNOR TO JOSEPH MERCADANTE, OF NEW YORK, N. Y.

MANIFOLD.

Application filed December 24, 1924. Serial No. 757,964.

*To all whom it may concern:*

Be it known that I, MELVIN SOLOMON GROH, a citizen of Canada, residing at Toronto, in the county of York, in the Province of Ontario, Canada, have invented a new and useful Improvement in Manifolds, of which the following is a specification.

My invention relates to manifolds which will fill or empty an operating machine with any desired fluid, which will also permit normal operation of said operating machine whenever desired, and which will be of simpler and more efficient construction than any manifolds heretofore in use.

Figure 1:
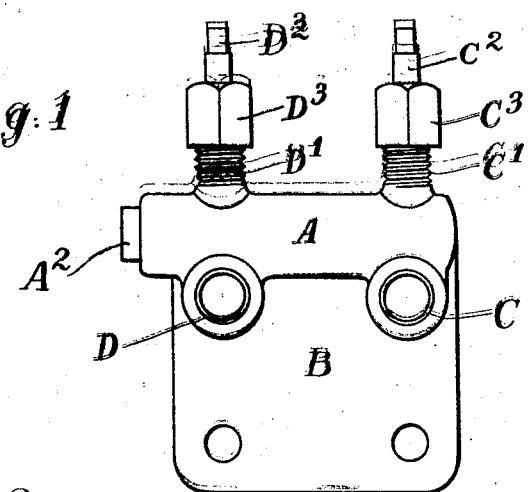
Figure 2:
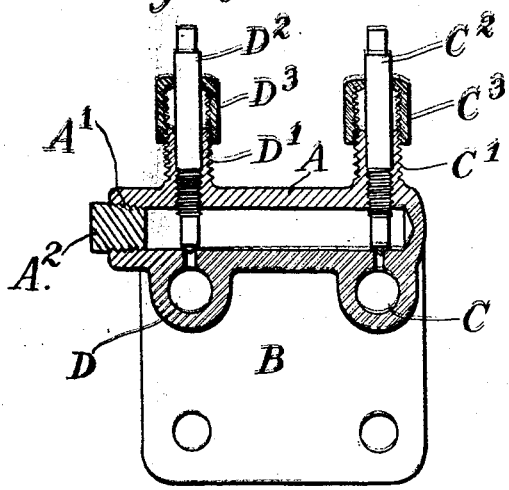
Figure 3:
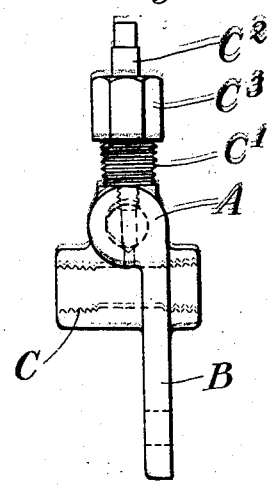
Figure 4:
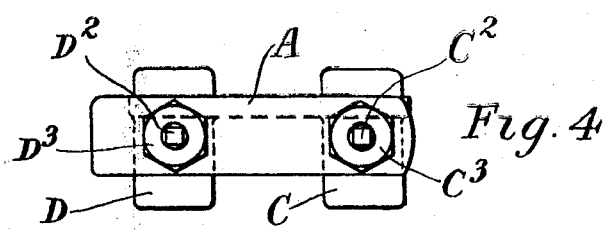

I attain these objects by the mechanism illustrated in the accompanying drawings, in which:

Fig. 1 is a side view of my device; Fig. 2 is another side view of my device showing a portion thereof in section; Fig. 3 is an end view of my device; and Fig. 4 is a top view of my device.

Similar letters refer to similar parts throughout the several views:

A is the cross channel; B is a plate integral with cross channel A, and adapted to bolt the same in any convenient position; C is the intake line; $C^1$ is a threaded lug to hold stuffing box $C^3$; $C^2$ is a needle valve to open or close the connection between cross channel A and intake line C; D is the delivery line; $D^1$ is the threaded lug to hold stuffing box $D^3$; $D^2$ is a needle valve to open or close the connection between cross channel A and delivery line D. $A^1$ is a tap in the end of cross channel A, adapted to be plugged in the usual manner by a threaded plug $A^2$.

The operation of my device is as follows:

When it is desired to fill the operating machine with a fluid, remove threaded plug $A^2$, close valve $D^2$, open valve $C^2$, and inject the fluid through threaded opening $A^1$ into cross channel A, thus filling intake line C by means of opened valve $C^2$, and continue this filling process until the desired amount of fluid has been injected into the operating machine. Then insert plug $A^2$ tightly into tap $A^1$, then close valve $C^2$. The operating machine is then in condition to function normally with intake line C and delivery line D independent of each other.

When it is desired to discharge the fluid from the operating machine, remove threaded plug $A^2$, open valve $D^2$, and operate the operating machine, whereupon the fluid in delivery line D will run out by means of the opened valve $D^2$, and continue this discharging process until the fluid has been partially or completely expelled, as desired.

I claim:

In a manifold, a cross channel permanently closed at one end, and having its other end adapted to open or close independently of the needle valves hereinafter mentioned; an intake line substantially at right angles to said cross channel and connected to said cross channel by a substantially smaller connecting channel, said connecting channel being adapted to be opened or closed by a needle valve; and a delivery line substantially at right angles to said cross channel and connected to said cross channel by a substantially smaller connecting channel, said connecting channel being adapted to be opened or closed by a needle valve; said intake line and said delivery line each being adapted to circulate their contents independently when their respective needle valves are closed with relation to the cross channel.

MELVIN SOLOMON GROH.